US011829771B2

(12) United States Patent
 Curtin et al.

(10) Patent No.: US 11,829,771 B2
(45) Date of Patent: Nov. 28, 2023

(54) QUICK PRESENTATION OF CAMERA VIDEO IN A VEHICLE USING LINUX

(71) Applicant: Red Hat, Inc., Raleigh, NC (US)

(72) Inventors: Eric Curtin, Cork (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/732,814

(22) Filed: Apr. 29, 2022

(65) Prior Publication Data
 US 2023/0350690 A1   Nov. 2, 2023

(51) Int. Cl.
  *G06F 9/44*    (2018.01)
  *G06F 9/4401*  (2018.01)
  *H04N 5/262*   (2006.01)
  *H04N 5/268*   (2006.01)
  *H04N 7/18*    (2006.01)
  *G06F 9/445*   (2018.01)

(52) U.S. Cl.
  CPC ........ *G06F 9/4401* (2013.01); *G06F 9/44505* (2013.01); *H04N 5/268* (2013.01); *H04N 5/2628* (2013.01); *H04N 7/18* (2013.01); *G06F 9/44594* (2013.01)

(58) Field of Classification Search
  CPC . G06F 9/4401; G06F 9/44505; H04N 5/2628; H04N 5/268; H04N 7/18
  See application file for complete search history.

(56) References Cited

U.S. PATENT DOCUMENTS

| 8,887,159 B2 | 11/2014 | Takahashi et al. |
| 10,394,570 B2 | 8/2019 | Baik et al. |
| 10,604,072 B2 | 3/2020 | Honghalli Devaraju |
| 2015/0149759 A1 | 5/2015 | Tsuji |

FOREIGN PATENT DOCUMENTS

| CN | 106427782 A | 2/2017 |
| KR | 20100058163 A | 6/2010 |
| KR | 101542742 B1 | 8/2015 |
| WO | 2020061805 A1 | 4/2020 |

OTHER PUBLICATIONS

Shelly, P. et al., "Advanced In-Vehicle Systems: A Reference Design for the Future," SAE Technical Paper 2016-01-0085, Apr. 5, 2016, 6 pages.
Marathe, Y. et al., "Boot time optimization techniques for automotive rear view camera systems," 2016 IEEE International Conference on Consumer Electronics (ICCE), Jan. 7-11, 2016, Las Vegas, NV, IEEE, pp. 77-80.
Extended European Search Report for European Patent Application No. 22192330.3, dated May 22, 2023, 9 pages.

*Primary Examiner* — Zahid Choudhury
(74) *Attorney, Agent, or Firm* — Dority & Manning, P.A.

(57) ABSTRACT

During a boot process of a computing device, a boot loader loads a kernel and an initial RAM disk image from a persistent storage device into RAM. The initial RAM disk image includes a file system that includes a camera application. The kernel is invoked, and the kernel mounts a RAM disk from the initial RAM disk image as a root file system. The kernel causes an initiation of the camera application into a user space. The camera application obtains an image frame from a camera. The camera application processes the image frame to generate a processed image frame, and provides the processed image frame to a frame buffer for presentation of the processed image frame on a display device.

20 Claims, 11 Drawing Sheets

QUICK PRESENTATION OF CAMERA VIDEO IN A VEHICLE USING LINUX

BACKGROUND

Automobiles are increasingly automated and rely on a variety of complex software to implement many features. One such feature is the presentation of camera video on a display device in the vehicle that allows a driver to view what is behind the vehicle as the vehicle begins to move backward.

SUMMARY

The examples disclosed herein implement quick presentation of camera video in a vehicle using Linux.

In one example a method is provided. The method includes, during a boot process of a computing device comprising a processor device and a random access memory (RAM), loading, by a boot loader, a kernel and an initial RAM disk image from a persistent storage device into the RAM, the initial RAM disk image including a first file system that includes a camera application. The method further includes invoking the kernel. The method further includes mounting, by the kernel, a RAM disk from the initial RAM disk image as a root file system. The method further includes causing, by the kernel, an initiation of the camera application into a user space, the kernel implementing a kernel space and the user space. The method further includes obtaining, by the camera application, an image frame from a camera. The method further includes processing, by the camera application, the image frame to generate a processed image frame, and providing, by the camera application, the processed image frame to a frame buffer for presentation of the processed image frame on a display device.

In another example a system is provided. The system includes a camera and a computing device. The computing device includes a random access memory (RAM) and one or more processor devices to, during a boot process of the computing device, load, by a boot loader, a kernel and an initial RAM disk image from a persistent storage device into the RAM, the initial RAM disk image including a first file system that includes a camera application. The one or more processor devices are further to invoke the kernel. The one or more processor devices are further to mount, by the kernel, a RAM disk from the initial RAM disk image as a root file system. The one or more processor devices are further to cause, by the kernel, an initiation of the camera application into a user space, the kernel implementing a kernel space and the user space. The one or more processor devices are further to obtain, by the camera application, an image frame from the camera. The one or more processor devices are further to process, by the camera application, the image frame to generate a processed image frame, and provide, by the camera application, the processed image frame to a frame buffer for presentation of the processed image frame on a display device.

In another example a non-transitory computer-readable storage medium is provided. The non-transitory computer-readable storage medium includes executable instructions to cause a processor device of a computing device to, during a boot process of the computing device, load, by a boot loader, a kernel and an initial RAM disk image from a persistent storage device into the RAM, the initial RAM disk image including a first file system that includes a camera application. The instructions further cause the processor device to invoke the kernel. The instructions further cause the processor device to mount, by the kernel, a RAM disk from the initial RAM disk image as a root file system. The instructions further cause the processor device to cause, by the kernel, an initiation of the camera application into a user space, the kernel implementing a kernel space and the user space. The instructions further cause the processor device to obtain, by the camera application, an image frame from the camera, process, by the camera application, the image frame to generate a processed image frame, and provide, by the camera application, the processed image frame to a frame buffer for presentation of the processed image frame on a display device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
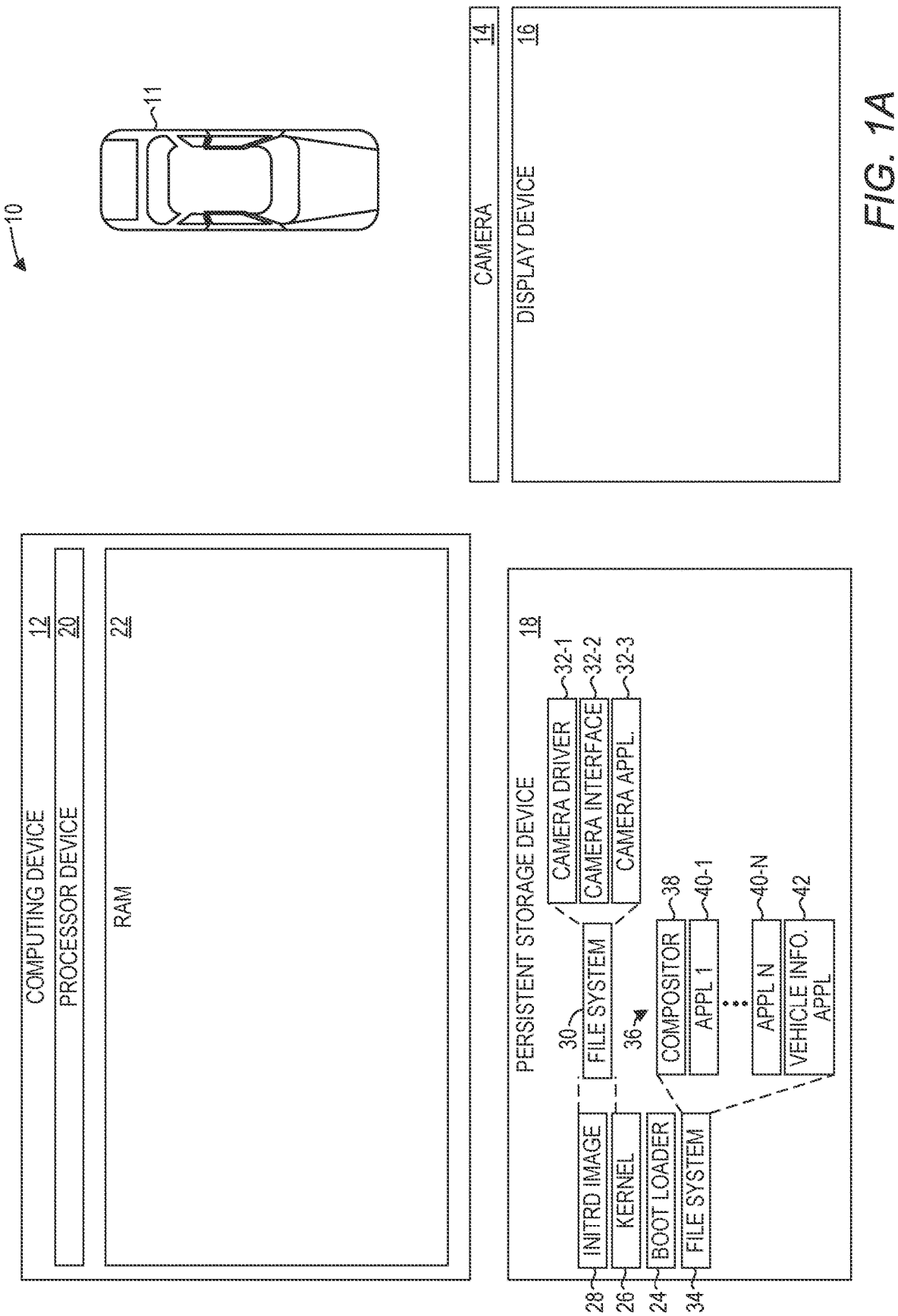
FIGS. 1A-1C are block diagrams at successive points in time of a system suitable for implementing quick presentation of camera video in a vehicle using Linux according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Automobiles are increasingly automated and rely on a variety of complex software to implement many features. One such feature is the presentation of camera video on a display device in the vehicle that allows a driver to view what is behind the vehicle as the vehicle begins to move backward.

The Linux operating system (hereinafter "Linux") is a well-known, robust open-source operating system that is used throughout the world in many different applications. There are many advantages to using Linux in lieu of special-purpose software where possible. Such advantages include the myriad developers that are familiar with Linux, the extensive testing and refinement of Linux over the years, and the overall technical superiority of Linux over many other operating systems.

Linux has a generalized boot sequence that involves the initiation of different applications/services as the operating system initiates. One common such application is a compositing window manager, sometimes referred to as a compositor, that provides certain windowing features to applications that present information on a display device. The compositor may provide to each different application an off-screen buffer, composite the multiple off-screen buffers into an image, and write the image to a display device memory for presentation on the display device. The use of a compositor both simplifies presenting information on a display device for an application and allows the concurrent output of multiple different applications on a display device.

A compositor is a relatively complex software package that requires a substantial time to boot and, when active, involves multiple repeated context switches from kernel space to user space, which are relatively time-consuming. Accordingly, while the use of a compositor has a number of advantages, in a situation where it is desirable to present imagery on a display device as soon as possible as Linux boots, the use of a compositor may be prohibitively slow.

It is desirable, and in some instances mandatory by government regulation, that camera imagery be presented on a display device in a vehicle within a determined period of time, such as within two seconds, five seconds, or the like, after a particular event. For example, when a driver of a vehicle places the vehicle in reverse to allow the vehicle to move backward, it may be desirable or required to present camera imagery from a rear-facing camera on a display device within a determined period of time so the driver can view what is behind the vehicle as the vehicle moves backward. Drivers often place a vehicle in reverse within seconds of starting the vehicle. Part of the vehicle starting sequence is the initiation of the software that controls the vehicle, such as, in this case, Linux, and thus, it may be desirable or necessary to provide the camera imagery to the display device within seconds of Linux booting.

The examples disclosed herein implement quick presentation of camera video in a vehicle using Linux. A boot loader loads a kernel and an initial RAM disk image from a persistent storage device. The initial RAM disk image includes a file system that includes a camera application. The initial RAM disk image is loaded as a RAM disk in a memory, and the RAM disk is mounted as a root file system of the kernel. The kernel causes the initiation of the camera application, and the camera application obtains an image frame from a camera. The camera application processes the image frame for presentation on a display device and provides the processed image frame to a frame buffer for presentation on the display device. By loading the camera application from the initial RAM disk image, the camera application is loaded quickly and is prioritized to be initiated prior to other applications that are part of the initialization sequence of the kernel. The camera application communicates with the kernel to obtain image frames and provides processed image frames to the kernel for presentation on the display device, eliminating a need to perform inter-process communication with a compositor window application. The examples, in this manner, result in the quick presentation of camera video on a display device soon after the boot loading process begins.

FIG. 1A is a block diagram of a system 10 according to one implementation. The system 10 may be part of a vehicle 11. The system 10 includes a computing device 12 that is in communication with a camera 14, a display device 16, and a persistent storage device 18. The computing device 12 includes one or more processor devices 20, and a volatile random access memory (RAM) 22. The persistent storage device 18 maintains stored data even when powered off. In this example, the camera 14 is a rear-facing camera and thus generates imagery that captures a scene behind the vehicle 11.

The persistent storage device 18 includes a boot loader 24 that is first accessed by the computing device 12 when the computing device 12 initializes. The computing device 12 may initialize in response to a trigger event, such as, by way of non-limiting example, the pressing of a vehicle start button by a user of the vehicle 11, the turning of an ignition key, the receipt of a signal from a wireless device, the opening of a door of the vehicle 11, or any other desired trigger event.

The persistent storage device 18 also includes an operating system, in this example a Linux operating system, referred to herein as a kernel 26. The persistent storage device 18 includes an initial RAM disk image 28, that includes a file system 30. The file system 30 includes one or more folders and a plurality of files, including a camera driver 32-1, a camera interface 32-2, and a camera application 32-3. The persistent storage device 18 also includes a file system 34 that includes a plurality of files 36, such as a compositor application 38, a plurality of applications 40-1-40-N, and a vehicle information application 42.

Figure 1B:
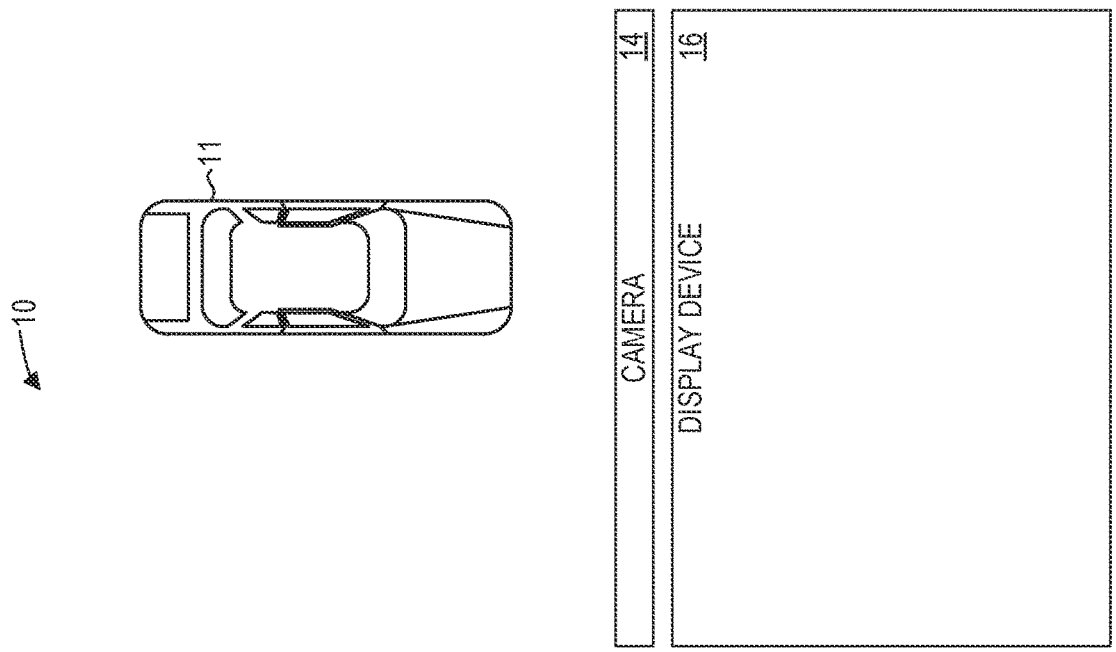
Figure 1B:
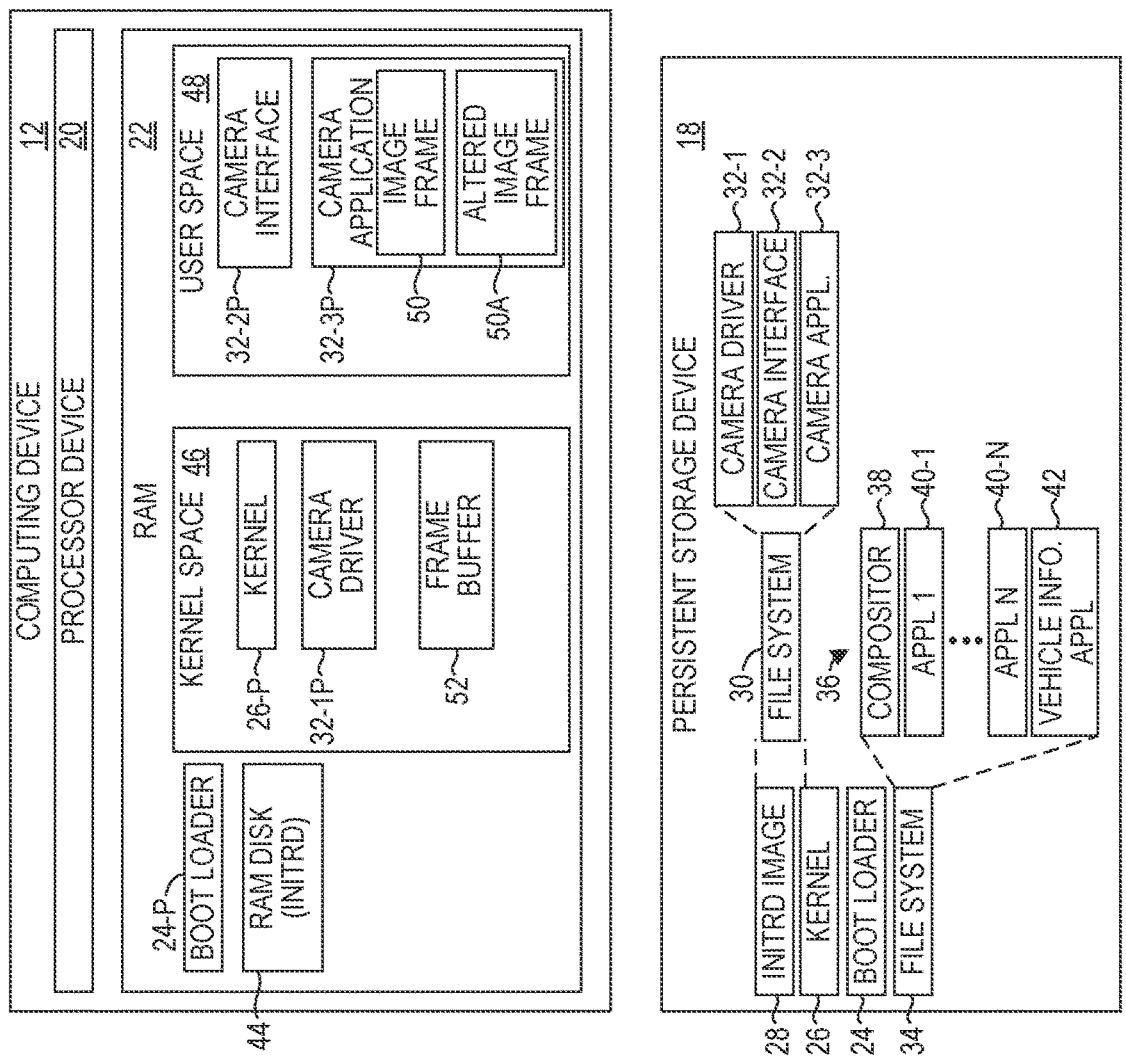

Referring now to FIG. 1B, as an example of quick presentation of camera video in a vehicle using Linux, assume that a user enters the vehicle 11 and causes a trigger event, such as the pressing of an ignition button in the vehicle 11. In response to the trigger event, the computing device 12 powers on, and loads the boot loader 24 as a boot loader process 24-P (hereinafter the "boot loader 24-P") in the RAM 22. The boot loader 24-P accesses the persistent storage device 18 and loads and initiates the kernel 26 as a kernel process 26-P (hereinafter the "kernel 26-P"). The kernel 26-P establishes a kernel space 46 and a user space 48. Certain types of applications, such as kernel extensions or modules, and device drivers, are typically initiated in the kernel space 46, while all other applications are initiated in the user space 48.

The boot loader 24-P also loads the initial RAM disk image 28 into the RAM 22. The kernel 26-P has an initialization phase and a post initialization phase. During the initialization phase, the kernel 26-P performs a plurality of predetermined steps that may be identified, for example, in one or more configuration files, such as boot sequence files, or the like. After the initialization phase, the kernel 26-P may then perform various actions in response to operator and/or programmatic requests. The kernel 26-P may process the initial RAM disk image 28 to convert the initial RAM disk image 28 into a RAM disk 44. The kernel 26-P mounts the RAM disk 44 as a root file system. The RAM disk 44 includes the file system 30. The kernel 26-P accesses the camera driver 32-1 from the RAM disk 44 and initiates the camera driver 32-1 as a camera driver process 32-1P (hereinafter the "camera driver 32-1P") in the kernel space 46. The kernel 26-P accesses the camera interface 32-2 from the RAM disk 44 and initiates the camera interface 32-2 as a camera interface process 32-2P (hereinafter the "camera interface 32-2P") in the user space 48. In some implementations, the camera interface 32-2P may comprise the libcamera camera stack available at libcamera.org/. The kernel 26-P accesses the camera application 32-3 from the RAM disk 44 and initiates the camera application 32-3 as a camera application process 32-3P (hereinafter the "camera application 32-3P") in the user space 48.

The camera application 32-3P communicates with the camera interface 32-2P to obtain, via the camera driver 32-1P, an image frame 50 from the camera 14. The camera application 32-3P may perform image altering processes on the image frame 50, such as, by way of non-limiting example, decompressing the image frame 50, altering a size of the image frame 50 based on a size of the display device 16, converting pixels of the image frame 50 from one pixel format to another pixel format, such as from MJPG to XR24, or the like. Each such alteration may result in a successive processed image frame 50A, and because the camera application 32-3P performs the altering processes, there is no relatively slow, inter-process communication between different applications that may otherwise be necessary to implement such altering processes. Inter-process communications involve relatively slow context switching from user space to kernel space and back to user space, resulting in delays that the camera application 32-3 avoids by performing all necessary image processing. The camera application 32-3P then provides the processed image frame 50A to a frame buffer 52. The processed image frame 50A may be presented by the camera driver 32-1P on the display device 16. The camera application 32-3 may obtain subsequent image frames from the camera 14, process such image frames, and provide processed image frames to the frame buffer 52 at a determined rate, such as 60 image frames per second.

In this manner, the driver of the vehicle 11, shortly after causing the trigger event, such as pressing the ignition key or placing the vehicle 11 in a reverse mode, can relatively quickly be presented with camera video of the scene behind the vehicle 11 and can safely cause the vehicle 11 to move in the reverse direction.

Figure 1C:
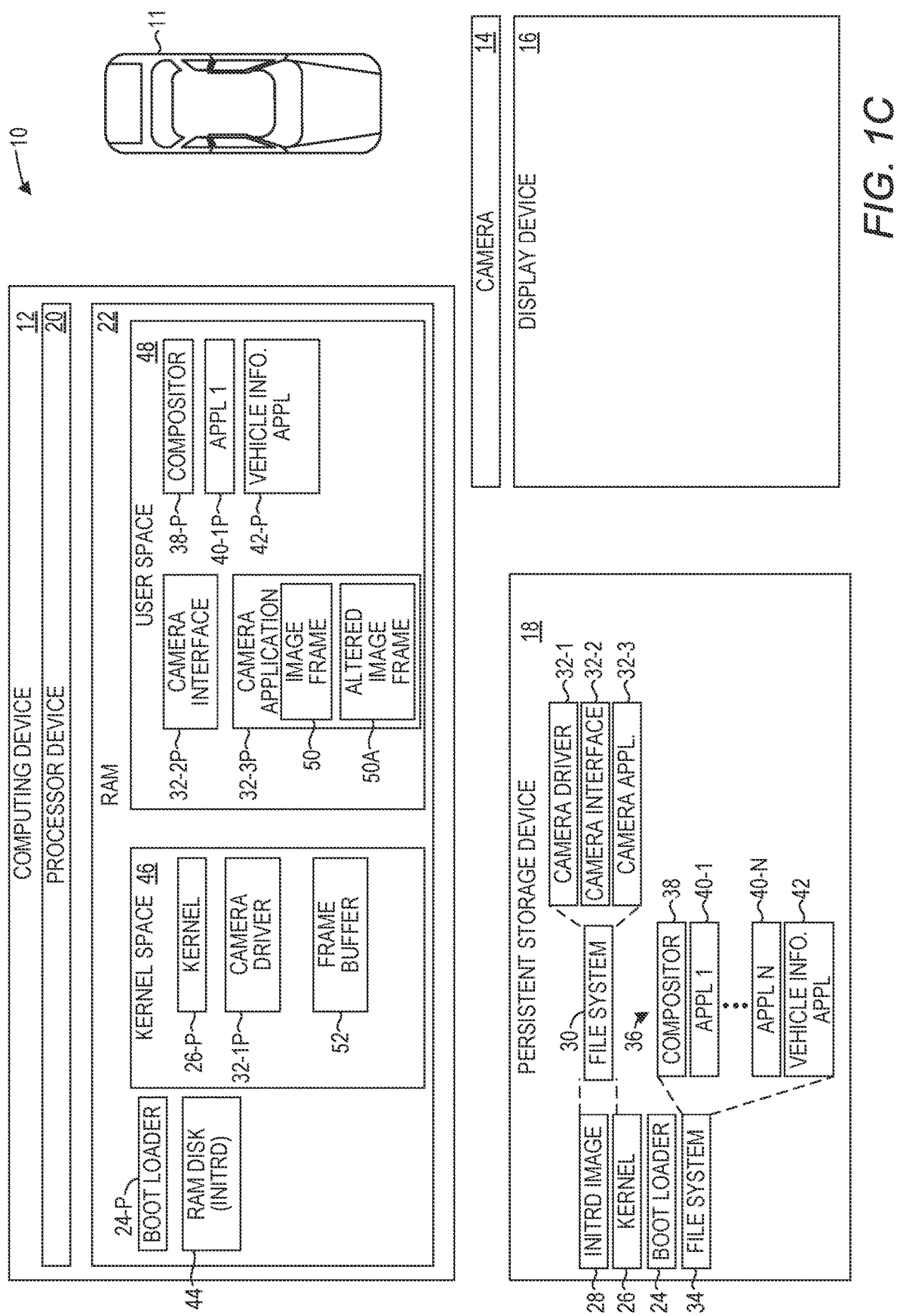

Referring now to FIG. 1C, subsequent to initiating the camera application 32-3P, the kernel 26-P may change the root file system from the RAM disk 44 to the file system 34 on the persistent storage device 18. The kernel 26-P may then initiate the compositor application 38 in the user space 48 as a compositor process 38-P (hereinafter the "compositor 38-P"). The kernel 26-P may also initiate one or more of the applications 40, such as the application 40-1, in the user space 48, as an application process 40-1P (hereinafter the "application process 40-1P"). The kernel 26-P may also initiate the vehicle information application 42 in the user space 48 as a vehicle information application process 42-P (hereinafter the "vehicle information application 42-P").

The compositor 38-P is a compositing window manager and is configured to receive image data from one or more applications, such as the application 40-1P and/or the vehicle information application 42-P, process such image data, and cause such image data to be presented on the display device 16. The compositor 38-P may comprise any compositing window manager, such as, by way of non-limiting example, picom, available at github.com/yshui/picom.

In response to a trigger event, a signal may be sent to the vehicle information application 42-P to generate and present information on the display device 16. The trigger event may comprise, for example, a mode change of the vehicle 11 from a reverse mode to a forward mode, or a user input that requests that information be provided on the display device 16 other than imagery from the camera 14. The vehicle information application 42-P may then generate imagery and provide the imagery to the compositor 38-P for presentation on the display device 16. The kernel 26-P may then, in response to the trigger event, send a message to the camera application 32-3P to terminate. The kernel 26-P may determine that the camera application 32-3P has terminated, and in response, unload the RAM disk 44 from the RAM 22, freeing the memory used by the RAM disk 44.

Figure 2:
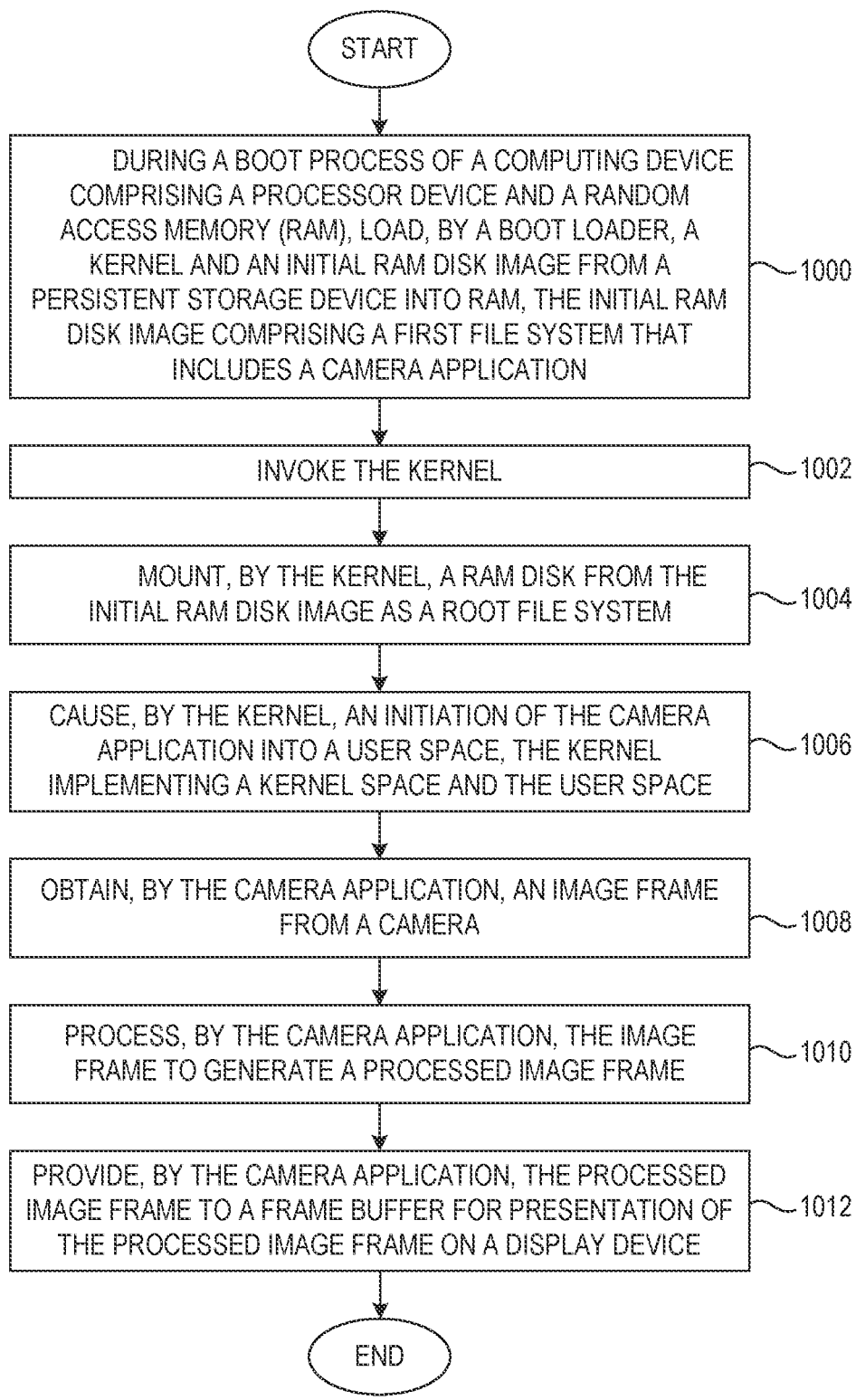
FIG. 2 is a flowchart of a method for implementing quick presentation of camera video in a vehicle using Linux according to one implantation.

FIG. 2 is a flowchart of a method for implementing quick presentation of camera video in the vehicle 11 using Linux according to one implantation. FIG. 2 will be discussed in conjunction with FIG. 1. During a boot process of the computing device 12, the boot loader 24-P loads the kernel 26 and the initial RAM disk image 28 from the persistent storage device 18 into the RAM 22. The initial RAM disk image 28 comprising the file system 30 that includes the camera application 32-3 (FIG. 2, block 1000). The boot loader 24-P invokes or otherwise initiates the kernel 26-P (FIG. 2, block 1002). The kernel 26-P mounts the RAM disk 44 from the initial RAM disk image 28 as a root file system (FIG. 2, block 1004). The kernel 26-P causes an initiation of the camera application 32-3P into the user space 48, the kernel 26-P implementing implementing the kernel space 46 and the user space 48 (FIG. 2, block 1006). The camera application 32-3P obtains the image frame 50 from the camera 14 (FIG. 2, block 1008). The camera application 32-3P processes the image frame 50 to generate the processed image frame 50A (FIG. 2, block 1010). The camera application 32-3P provides the processed image frame 50A to the frame buffer 52 for presentation of the processed image frame 50A on the display device 16 (FIG. 2, block 1012).

Figure 3:
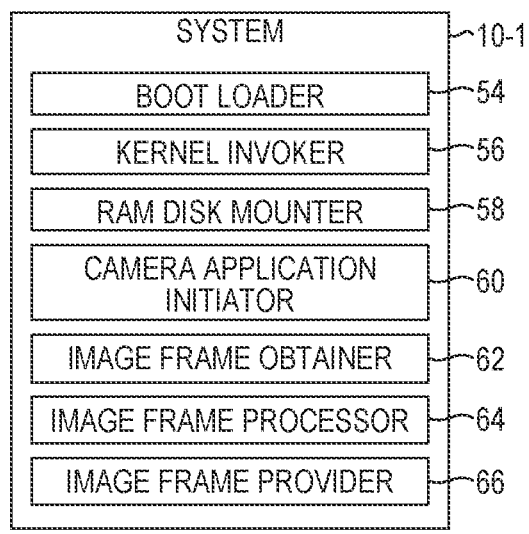
FIG. 3 is a block diagram of a system suitable for implementing aspects illustrated in FIGS. 1A-1C according to one implementation.

FIG. 3 is a block diagram of a system 10-1 suitable for implementing aspects illustrated in FIGS. 1A-1C according to one implementation. The system 10-1 implements identical functionality as that described above with regard to the system 10. The system 10-1 includes a boot loader 54 that is to, during a boot process of the computing device 12, load the kernel 26 and the initial RAM disk image 28 from the persistent storage device 18 into the RAM 22, the initial RAM disk image 28 comprising the file system 30 that includes the camera application 32-3P. The boot loader 54 may comprise executable software instructions configured to program a processor device to implement the functionality of loading the kernel 26 and the initial RAM disk image 28 from the persistent storage device 18 into the RAM 22, may comprise circuitry including, by way of non-limiting example, an application-specific integrated circuit (ASIC), field-programmable gate array (FPGA), or may comprise a combination of executable software instructions and circuitry. In some implementations, the boot loader 54 may comprise the LILO Linux bootloader, LOADLIN, or GRUB.

The system 10-1 also includes a kernel invoker 56 that is to invoke or otherwise initiate the kernel 26. The kernel invoker 56 may comprise executable software instructions configured to program a processor device to implement the functionality of invoking or otherwise initiating the kernel 26, may comprise circuitry including, by way of non-limiting example, an application-specific integrated circuit (ASIC), field-programmable gate array (FPGA), or may comprise a combination of executable software instructions and circuitry. In some implementations, the kernel invoker 56 may be part of the boot loader 54.

The system 10-1 also includes a RAM disk mounter 58 that is to mount the RAM disk 44 from the initial RAM disk image 28 as a root file system. The RAM disk mounter 58 may comprise executable software instructions configured to program a processor device to implement the functionality of mounting the RAM disk 44 from the initial RAM disk image 28 as a root file system, may comprise circuitry including, by way of non-limiting example, an application-specific integrated circuit (ASIC), field-programmable gate array (FPGA), or may comprise a combination of executable software instructions and circuitry. In some implementations, the RAM disk mounter 58 may be part of the kernel 26-P.

The system 10-1 also includes a camera application initiator 60 that is to cause the initiation of the camera application 32-3P in the user space 48. The camera application initiator 60 may comprise executable software instructions configured to program a processor device to implement the functionality of causing the initiation of the camera application 32-3P in the user space 48, may comprise circuitry including, by way of non-limiting example, an ASIC, FPGA, or may comprise a combination of executable software instructions and circuitry. In some implementations, camera application initiator 60 may be part of the kernel 26-P.

The system 10-1 also includes an image frame obtainer 62 that is to obtain the image frame 50 from the camera 14. The image frame obtainer 62 may comprise executable software instructions to program a processor device to implement the functionality of obtaining the image frame 50 from the camera 14, may comprise circuitry including, by way of non-limiting example, an ASIC, FPGA, or may comprise a combination of executable software instructions and circuitry. In some implementations, the image frame obtainer 62 may be implemented by a combination of the camera application 32-3P, the camera interface 32-2P, and the camera driver 32-1P.

The system 10-1 also includes an image frame processor 64 that is to process the image frame 50 to generate the processed image frame 50A. The image frame processor 64 may comprise executable software instructions to program a processor device to implement the functionality of processing the image frame 50 to generate the processed image frame 50A, may comprise circuitry including, by way of non-limiting example, an ASIC, FPGA, or may comprise a combination of executable software instructions and circuitry. In some implementations the image frame processor 64 is part of the camera application 32-3P.

The system 10-1 also includes an image frame provider 66 that is to provide the processed image frame 50A to the frame buffer 52. The image frame provider 66 may comprise executable software instructions to program a processor device to implement the functionality of providing the processed image frame 50A to the frame buffer 52, may comprise circuitry including, by way of non-limiting example, an ASIC, FPGA, or may comprise a combination of executable software instructions and circuitry. In some implementations, the image frame provider 66 is part of the camera application 32-3P.

Figure 4:
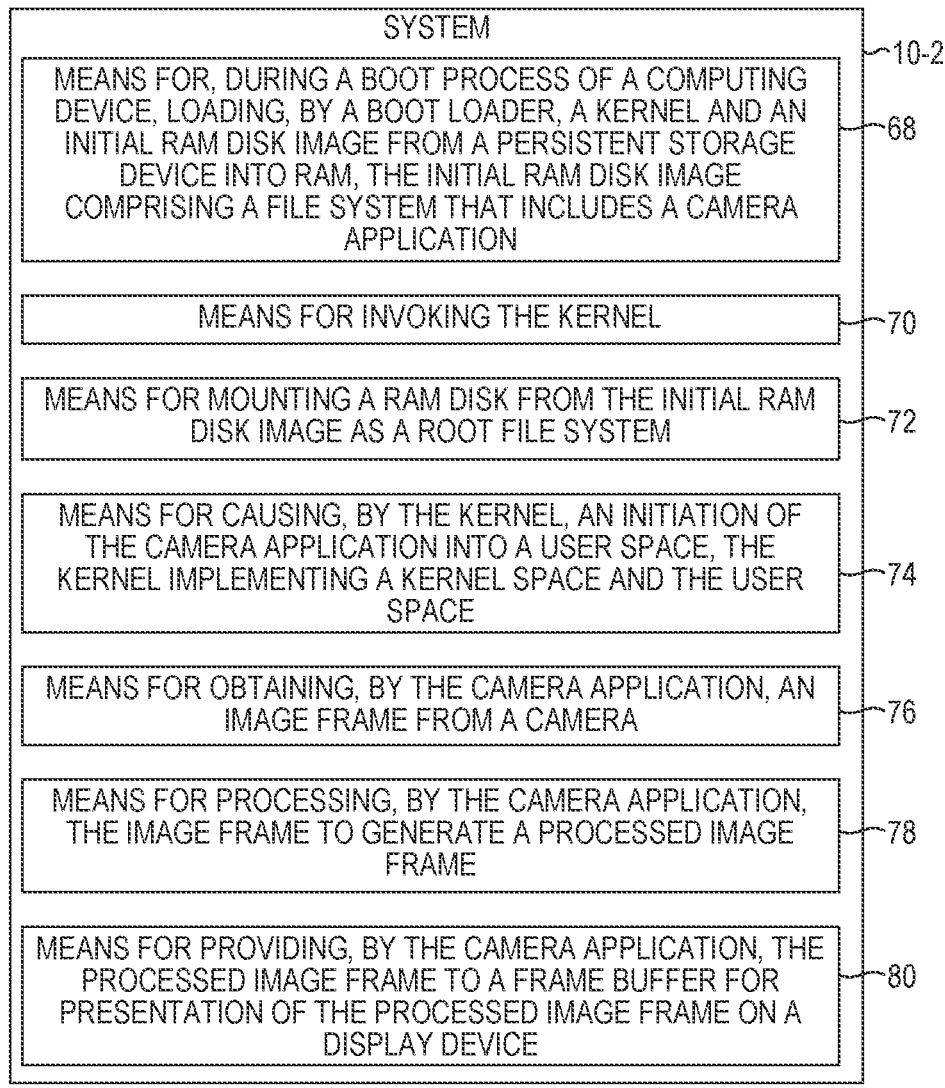
FIG. 4 is a block diagram of a system according to additional implementations.

FIG. 4 is a block diagram of a system 10-2 according to additional implementations. The system 10-2 implements identical functionality as that described above with regard to the computing device 12. The system 10-2 includes a means 68 for, during a boot process of the computing device 12, loading, by the boot loader 24-P, the kernel 26 and the initial RAM disk image 28 from the persistent storage device 18 into the RAM 22, the initial RAM disk image 28 comprising the file system 30 that includes the camera application 32-3P. The means 68 may be implemented in any number of manners, including, for example, via the boot loader 54 illustrated in FIG. 3.

The system 10-2 includes a means 70 for invoking or otherwise initiating the kernel 26-P. The means 70 may be implemented in any number of manners, including, for example, via the kernel invoker 56 illustrated in FIG. 3. The system 10-2 includes a means 72 for mounting the RAM disk 44 from the initial RAM disk image 28 as a root file system. The means 72 may be implemented in any number of manners, including, for example, via the RAM disk mounter 58 illustrated in FIG. 3.

The system 10-2 includes a means 74 for causing, by the kernel 26-P, an initiation of the camera application 32-3P into the user space 48, the kernel 26-P implementing the kernel space 46 and the user space 48. The means 74 may be implemented in any number of manners, including, for example, via the camera application initiator 60 illustrated in FIG. 3.

The system 10-2 includes a means 76 for obtaining, by the camera application 32-3P, the image frame 50 from the camera 14. The means 76 may be implemented in any number of manners, including, for example, via the image frame obtainer 62 illustrated in FIG. 3.

The system 10-2 includes a means 78 for processing, by the camera application 32-3P, the image frame 50 to generate the processed image frame 50A. The means 78 may be implemented in any number of manners, including, for example, via the image frame processor 64 illustrated in FIG. 3.

The system 10-2 includes a means 80 for providing, by the camera application 32-3P, the processed image frame 50A to the frame buffer 52 for presentation of the processed image frame 50A on the display device 16. The means 80 may be implemented in any number of manners, including, for example, via the image frame provider 66 illustrated in FIG. 3.

Figure 5:
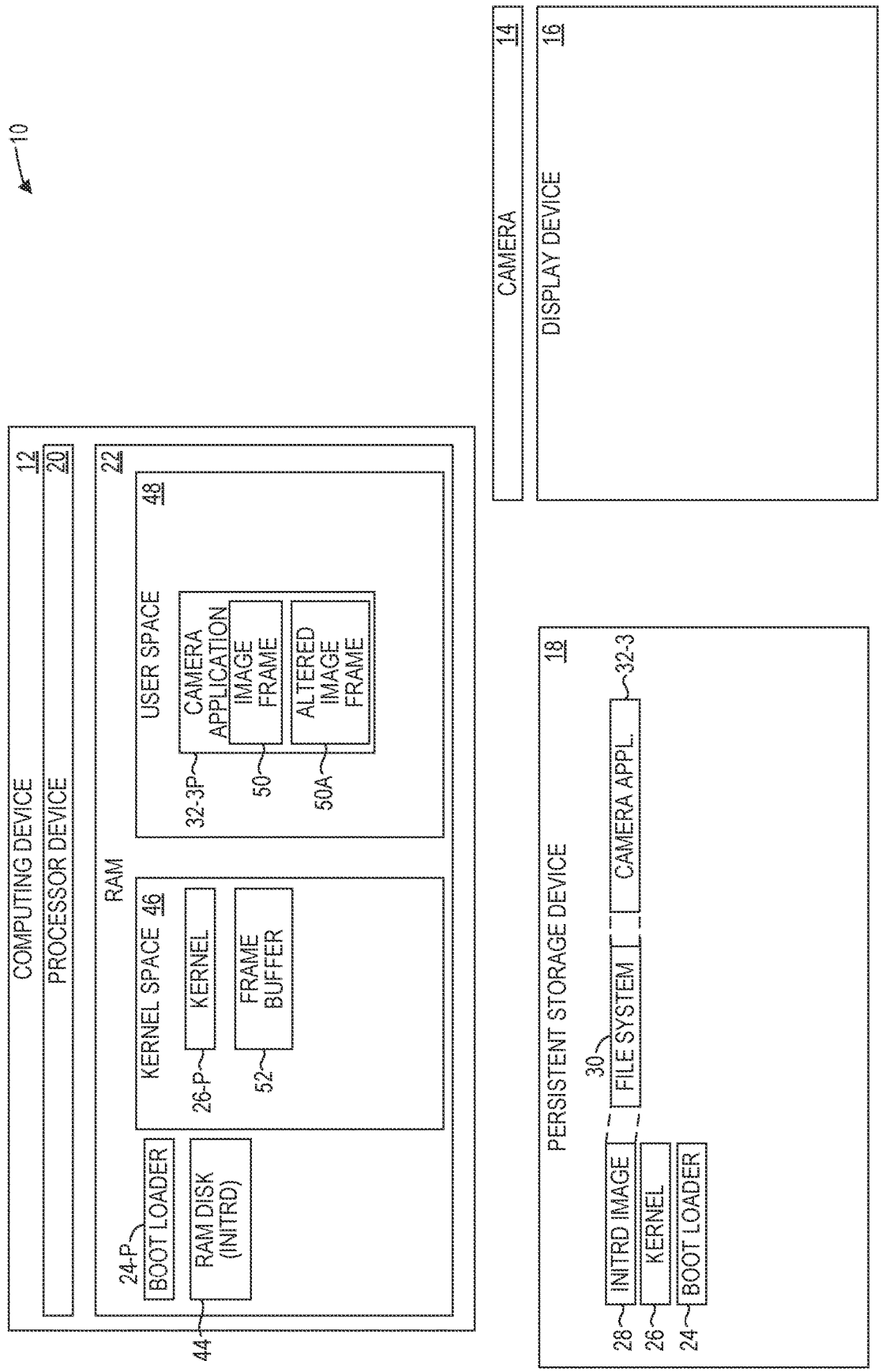
FIG. 5 is a simplified block diagram of the system illustrated in FIG. 1 according to one implementation.

FIG. 5 is a simplified block diagram of the system 10 illustrated in FIG. 1 according to one implementation. The system 10 includes the camera 14 and the computing device 12. The computing device 12 includes the RAM 22 and the one or more processor devices 20. The one or more processor devices 20 are to, during a boot process of the computing device 12, load, by the boot loader 24-P, the kernel 26 and the initial RAM disk image 28 from the persistent storage device 18 into the RAM 22, the initial RAM disk image 28 including the file system 30 that includes the camera application 32-3. The one or more processor devices 20 are further to invoke the kernel 26-P. The one or more processor devices 20 are further to mount, by the kernel 26-P, the RAM disk 44 from the initial RAM disk image 28 as a root file system. The one or more processor devices 20 are further to cause, by the kernel 26-P, an initiation of the camera application 32-3P into the user space 48, the kernel 26-P implementing the kernel space 46 and the user space 48. The one or more processor devices 20 are further to obtain, by the camera application 32-3P, the image frame 50 from the camera 14. The one or more processor devices 20 are further to process, by the camera application 32-3P, the image frame 50 to generate the processed image frame 50A. The one or more processor devices 20 are further to provide, by the camera application 32-3P, the processed image frame 50A to the frame buffer 52 for presentation of the processed image frame 50A on the display device 16.

Figure 6A:
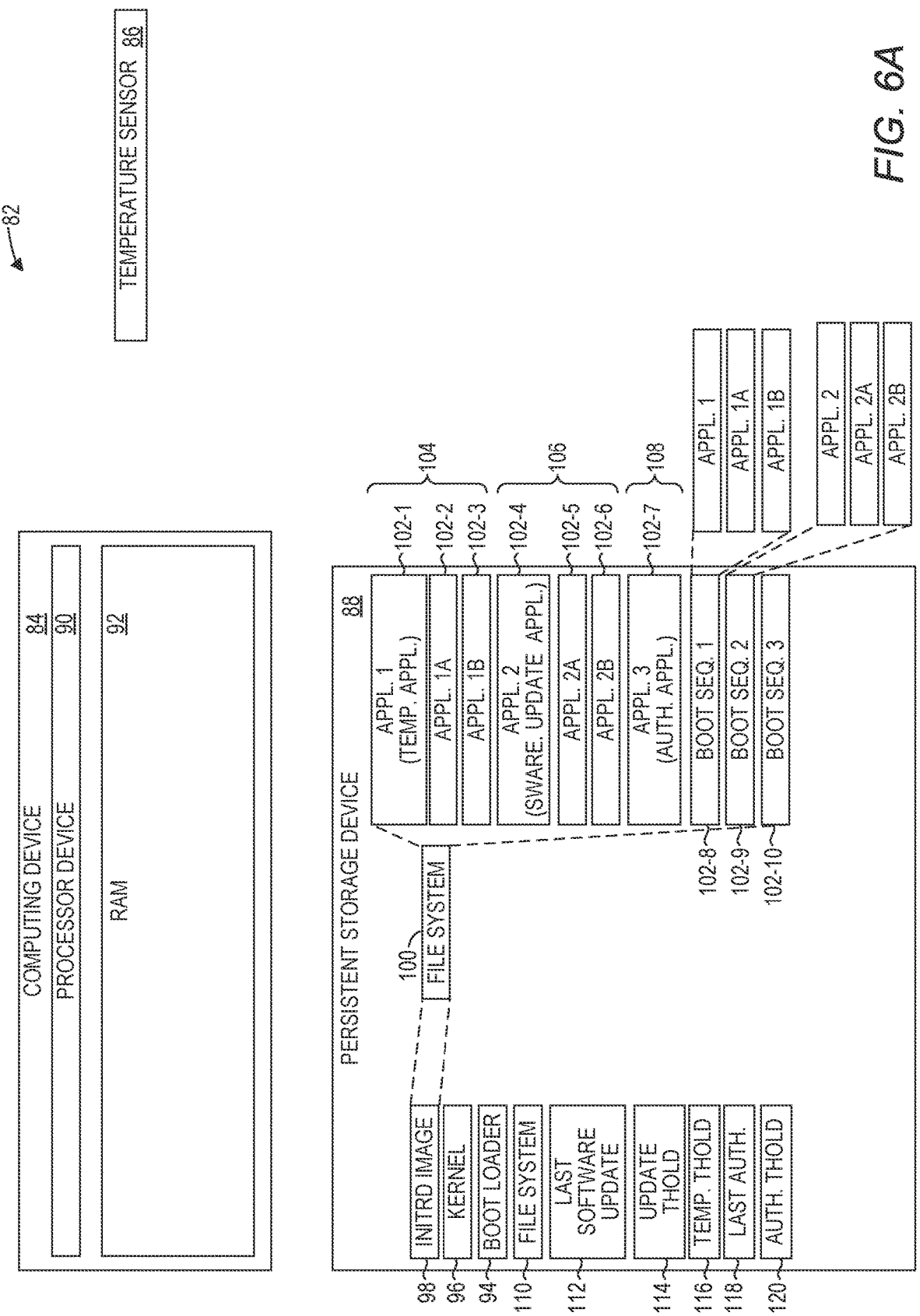
FIGS. 6A-6B are block diagrams at successive points in time of a system suitable for implementing service prioritization during initialization of an operating system according to one implementation.

FIG. 6A illustrates a system 82 in which additional implementations may be practiced. In these implementations, a service priority decision is made during an initialization stage of the Linux operating system to determine which service of a plurality of different services is to be prioritized. The term "service" used in this context refers to a desired functionality that may be implemented via the initiation of one or more applications. The applications are initiated from application files, such as executable or interpretable files. The system 82 includes a computing device 84 that is in communication with a temperature sensor 86 and a persistent storage device 88. The computing device 84 includes one or more processor devices 90, and a volatile RAM 92. The persistent storage device 88 maintains stored data even when powered off.

The persistent storage device 88 includes a boot loader 94 that operates substantially similarly to the boot loader 24, discussed above, except as otherwise discussed herein. The boot loader 94 is accessed by the computing device 84 when the computing device 84 initializes and begins the initialization, sometimes referred to as the boot process, of the computing device 84. The computing device 84 may initialize in response to a trigger event, such as, by way of non-limiting example, the pressing of a power-on button, or any other desired trigger event.

The persistent storage device 88 also includes an operating system, in this example a Linux operating system, referred to herein as a kernel 96. The kernel 96 operates substantially similarly to the kernel 26, discussed above, except as otherwise discussed herein. The persistent storage device 88 includes an initial RAM disk image 98, that includes a file system 100. The file system 100 includes one or more folders and a plurality of files, including a plurality of application files 102-1-102-3, which collectively implement a temperature regulation service 104. As an example, the application file 102-1 may be the primary temperature regulation application executable file for implementing the temperature regulation service 104, but may utilize certain libraries or interfaces that are implemented via the application files 102-2 and 102-3. Thus, collectively, the application files 102-1-102-3 implement the temperature regulation service 104.

The file system 100 also includes a plurality of application files 102-4-102-6 that collectively implement a software update service 106, and an application file 102-7 that implements an authentication service 108.

The file system 100 also includes a boot sequence file 102-8 that corresponds to the service 104 and that identifies a prioritized boot sequence if the service 104 is determined to be a prioritized service over the services 106 and 108. Thus, each boot sequence file 102-8-102-10 identifies the corresponding service 104, 106, 108 as the service that is to be initiated prior to the other services 104, 106, 108. In this example, the boot sequence file 102-8 indicates that the application file 102-1 is to be initiated first, the application file 102-2 is to be initiated second, the application file 102-3 is to be initiated third, and then additional files will be initiated (not shown).

The file system 100 also includes the boot sequence file 102-9 that corresponds to the service 106 and that identifies a prioritized boot sequence if the service 106 is determined to be a prioritized service over the services 104 and 108. In this example, the boot sequence file 102-9 indicates that the application file 102-4 is to be initiated first, the application file 102-5 is to be initiated second, and the application file 102-6 is to be initiated third, and then additional files will be initiated (not shown).

The file system 100 also includes the boot sequence file 102-10 that corresponds to the service 108, and that identifies a prioritized boot sequence if the service 108 is determined to be a prioritized service over the services 104 and 106.

The persistent storage device 88 also includes a file system 110 that includes a plurality of files, which may include copies of the application files 102-1-102-7, as well as other files that are initiated as part of the boot sequence subsequent to initiating the application files 102 that are associated with the prioritized service 104, 106 or 108. Thus, the file system 110 may be a superset of the file system 100.

The persistent storage device 88 may also include additional stored data used to determine which of the services 104, 106, and 108 is to be prioritized during booting of the computing device 84. A last software update 112 contains a timestamp of the last time software associated with the computing device 84 has been updated. An update threshold 114 identifies a maximum period of time from the last software update 112, such as one week, beyond which the computing device 84 should prioritize the update service 106 over the services 104 and 108. A temperature threshold 116 identifies a temperature that, should a current temperature obtained from the temperature sensor 86 be greater than the temperature threshold 116, the computing device 84 should prioritize the temperature regulation service 104 over the services 106 and 108. A last authentication 118 contains a timestamp of the last time authentication credentials were obtained from a user of the computing device 84. An authentication threshold 120 identifies a maximum period of time from the last authentication 118, such as one week, beyond which the computing device 84 should prioritize the authentication service 108 over the services 104 and 106.

Figure 6B:
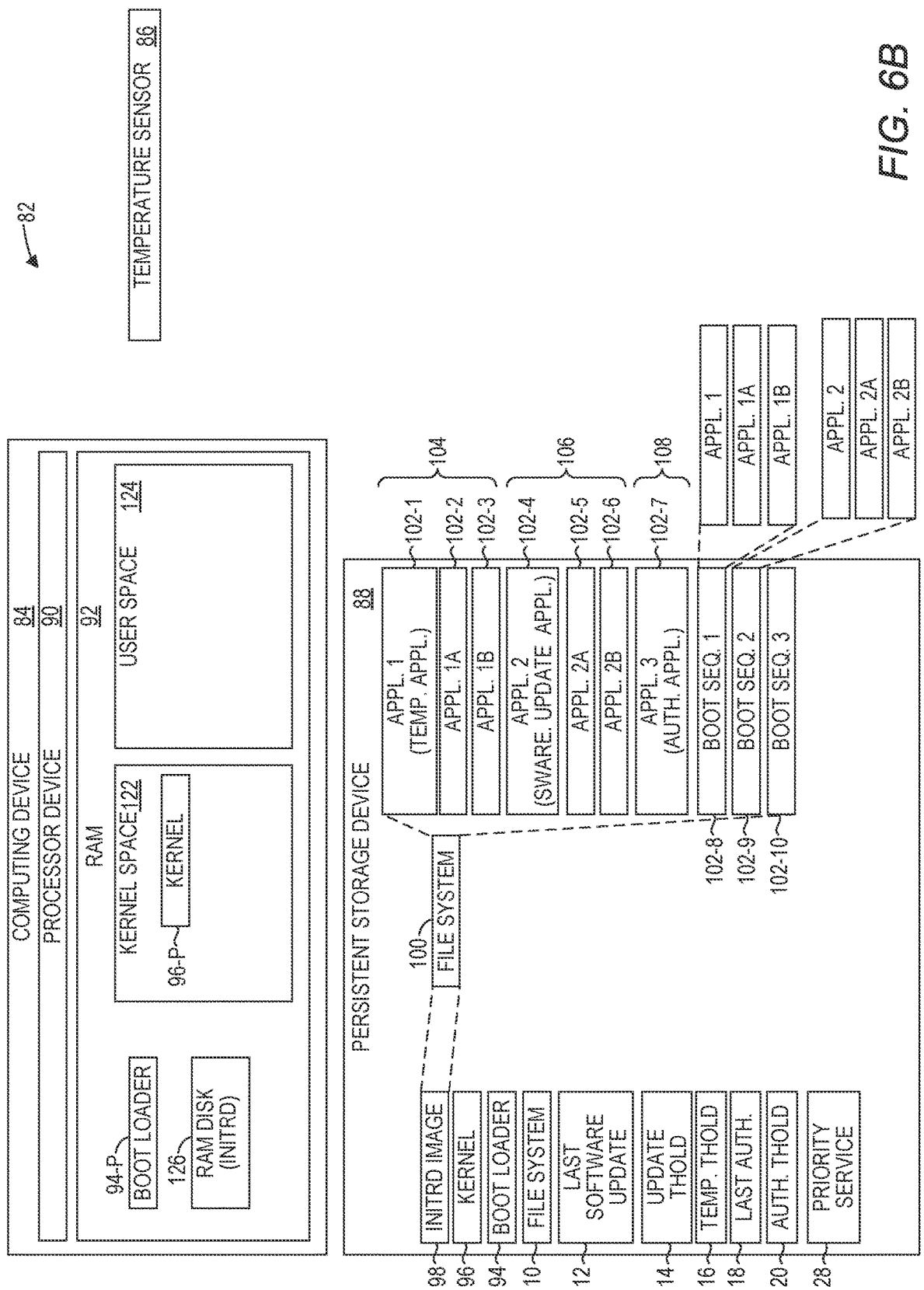

Referring now to FIG. 6B, an example of service prioritization will now be discussed. The examples will be discussed in the context of the computing device 84 being implemented in a vehicle, but the examples disclosed herein are not limited to vehicles or any other particular apparatus or application, and have applicability in any context where it may be desirable to quickly initiate a particular service over other services based on real time information that is obtained when the computing device is initially powered on, or otherwise caused to enter the boot up sequence.

In this example, assume that a user enters the vehicle that is controlled by the computing device 84 and causes a trigger event, such as the pressing of an ignition button in the vehicle, the opening of the driver-side door, or the like, that causes the computing device 84 to power on. In a conventional manner, the computing device 84 loads the boot loader 94 as a boot loader process 94-P (hereinafter the "boot loader 94-P") in the RAM 92. The boot loader 94-P accesses the persistent storage device 88 and loads and initiates the kernel 96 as a kernel process 96-P (hereinafter the "kernel 96-P"). The kernel 96-P establishes a kernel space 122 and a user space 124.

The boot loader 94-P also loads the initial RAM disk image 98 into the RAM 92. The kernel 96-P may process the initial RAM disk image 98 to convert the initial RAM disk image 98 into a RAM disk 126. The kernel 96-P mounts the RAM disk 126 as a root file system. The RAM disk 126 includes the file system 100, and thus the kernel 96-P can initiate applications from the relatively fast initial RAM disk 126 without having to access the applications on the relatively slow persistent storage 88.

The kernel 96-P determines information that identifies a priority service of the plurality of services 104, 106, and 108. The determination of the priority service may happen in any number of ways. In some implementations, the boot loader 94-P may determine which service 104, 106, and 108 should be prioritized, and provide such information to the kernel 96-P either directly during initiation of kernel 96-P, or indirectly such as by storing the information in a configuration file, such as a priority service 128 that the kernel 96-P may access. In such implementation, the boot loader 94-P may, for example, access real-time sensor data from the temperature sensor 86 that identifies a current temperature and compare the current temperature to the temperature threshold 116. If the current temperature exceeds the temperature threshold 116, the boot loader 94-P may determine that the temperature regulation service 104 is to be prioritized over the software update service 106 and the authentication service 108.

The boot loader 94-P may access the last software update 112 and the update threshold 114 and determine that the software update service 106 should be prioritized over the temperature regulation service 104 and the authentication service 108. The boot loader 94-P may access the last authentication 118 and the authentication threshold 120 and determine that the authentication service 108 should be prioritized over the temperature regulation service 104 and the software update service 106.

If the conditions suggest that multiple services 104, 106, and 108 are to be prioritized, such as if a current temperature exceeds the temperature threshold 116 and the last software update was performed at a previous time longer than that identified in the update threshold 114, the boot loader 94-P may access service prioritization information that identifies an order of services 104, 106, and 108.

In another implementation, the kernel 96-P, rather than the boot loader 94-P, may make the determination of which service is to be prioritized in a manner similar to that discussed above for the boot loader 94-P. In some implementations, the kernel 96-P may first initiate one or more preliminary applications, such as a temperature sensor driver that communicates with the temperature sensor 86, prior to determining which service is to be prioritized.

The kernel 96-P then accesses the boot sequence file 102-8-102-10 that corresponds to the prioritized service. The correspondence between the services 104, 106, and 108 and the boot sequence files 102-8-102-10 may be maintained on the persistent storage device 88. In this example, assume that the kernel 96-P determined information that identified the software update service 106 as a prioritized service. The kernel 96-P accesses the boot sequence file 102-9 and initiates, based on the boot sequence file 102-9, the application file 102-4, the application file 102-5, and the application file 102-6, which collectively initiates the software update service 106.

The software update service 106 may then quickly initiate and determine that the computing device 84 requires a software update, and may then cause a software update of the computing device 84.

Subsequent to initiating the software update service 106, the kernel 96-P may change the root file system from the RAM disk 126 to the file system 100 on the persistent storage device 88. The kernel 96-P may then initiate additional files identified in the boot sequence file 102-8 to complete the boot sequence. Such additional files are accessed from the file system 100 on the persistent storage device 88 rather than the RAM disk 126. For example, the kernel 96-P may initiate the files 102-1-102-3 from the file system 110, and the file 102-7 from the file system 110.

Figure 7:
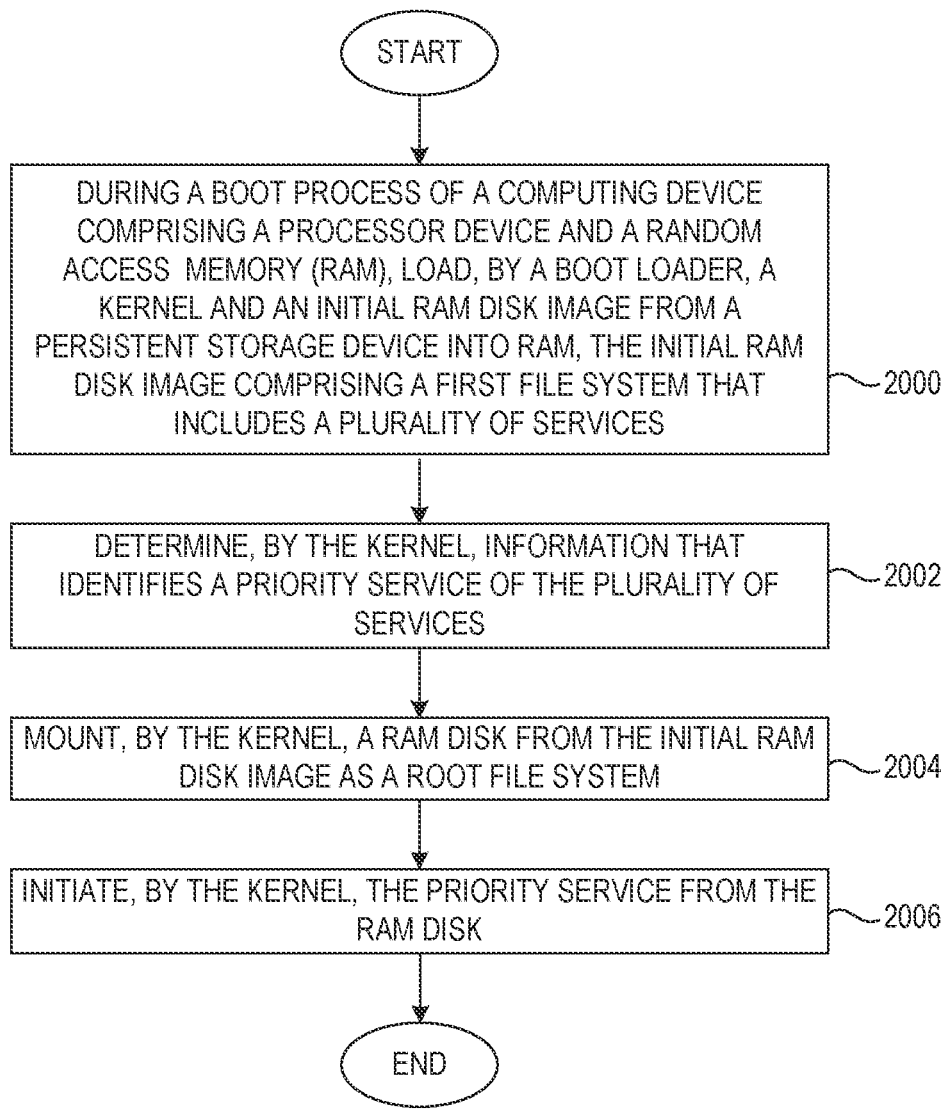
FIG. 7 is a flowchart of a method for implementing service prioritization during initialization of an operating system according to one implementation.

FIG. 7 is a flowchart of a method for service priority determination during initialization of an operating system according to one implementation. FIG. 7 will be discussed in conjunction with FIGS. 6A-6B. During the boot process of the computing device 84, the boot loader 94-P loads the kernel 96 and initiates the kernel 96-P, and loads the initial RAM disk image 98 from the persistent storage device 88 into the RAM 92, the initial RAM disk image 126 comprising the file system 100 that includes the plurality of services 104, 106, 108 (FIG. 7, block 2000). The kernel 96-P determines information that identifies a priority service of the plurality of services 104, 106, 108 (FIG. 7, block 2002). The kernel 96-P mounts the RAM disk 126 from the initial RAM disk image 98 as a root file system (FIG. 7, block 2004). The kernel 96-P initiates the priority service from the RAM disk 126 (FIG. 7, block 2006).

Figure 8:
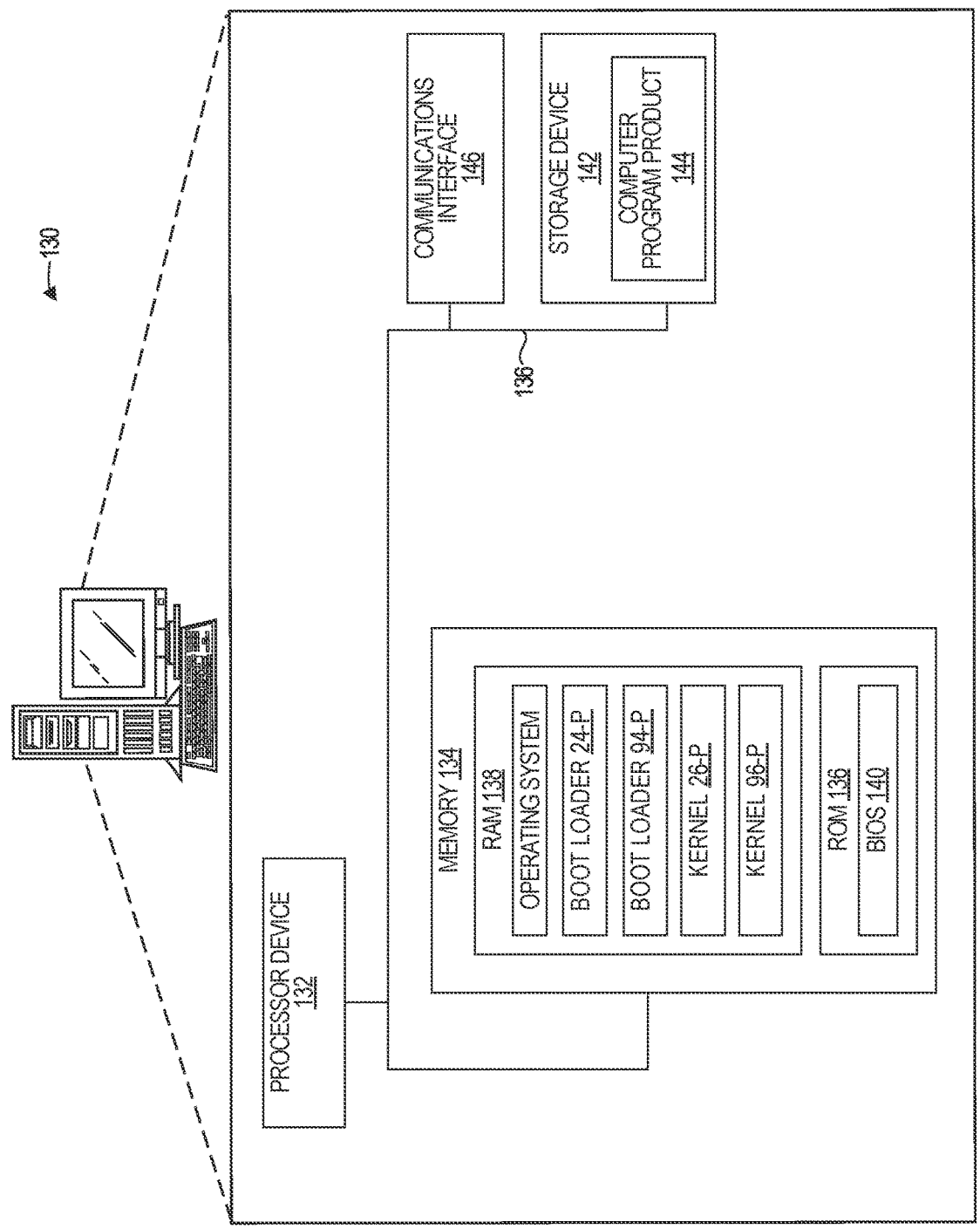
FIG. 8 is a block diagram of a computing device suitable for implementing examples disclosed herein.

FIG. 8 is a block diagram of a computing device 130 suitable for implementing the examples disclosed herein. The computing device 130 may comprise any computing or electronic device capable of including firmware, hardware, and/or executing software instructions to implement the functionality described herein. The computing device 130 includes one or more processor devices 132, a memory 134, and a system bus 136. The system bus 136 provides an interface for system components including, but not limited to, the system memory 134 and the processor device 132. The processor device 132 can be any commercially available or proprietary processor.

The system bus 136 may be any of several types of bus structures that may further interconnect to a memory bus (with or without a memory controller), a peripheral bus, and/or a local bus using any of a variety of commercially available bus architectures. The system memory 134 may include non-volatile memory 136 (e.g., read-only memory (ROM), erasable programmable read-only memory (EPROM), electrically erasable programmable read-only memory (EEPROM), etc.), and volatile memory 138 (e.g., random-access memory (RAM)). A basic input/output system (BIOS) 140 may be stored in the non-volatile memory 136 and can include the basic routines that help to transfer information between elements within the computing device 130. The volatile memory 138 may also include a high-speed RAM, such as static RAM, for caching data.

The computing device 130 may further include or be coupled to a non-transitory computer-readable storage medium such as a storage device 142, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 142 and other drives associated with computer-readable media and computer-usable media may provide non-volatile storage of data, data structures, computer-executable instructions, and the like.

A number of modules can be stored in the storage device 142 and in the volatile memory 138, including an operating system and one or more program modules, such as the boot loaders 24-P, 94-P, and the kernels 26-P, 96-P, which may implement the functionality described herein in whole or in part. All or a portion of the examples may be implemented as a computer program product 144 stored on a transitory or non-transitory computer-usable or computer-readable storage medium, such as the storage device 142, which includes complex programming instructions, such as complex computer-readable program code, to cause the processor device 132 to carry out the steps described herein. Thus, the computer-readable program code can comprise software instructions for implementing the functionality of the examples described herein when executed on the processor device 132. The computing device 130 may also include a communications interface 146 suitable for communicating with a network as appropriate or desired.

Other computer system designs and configurations may also be suitable to implement the systems and methods described herein. The following examples illustrate various implementations in accordance with one or more aspects of the disclosure.

Example 1 is a system that includes a boot loader that is to, during a boot process of a computing device, load a kernel and an initial RAM disk image from a persistent storage device into a RAM, the initial RAM disk image including a file system that includes a camera application; a kernel invoker that is to invoke or otherwise initiate the kernel; a RAM disk mounter that is to mount the RAM disk from the initial RAM disk image as a root file system; a camera application initiator that is to cause the initiation of the camera application in the user space; an image frame obtainer that is to obtain an image frame from a camera; an image frame processor that is to process the image frame to generate the processed image frame; and an image frame provider that is to provide the processed image frame to a frame buffer.

Example 2 is a system that includes a means for, during a boot process of a computing device, loading, by a boot loader, a kernel and an initial RAM disk image from a persistent storage device into a RAM, the initial RAM disk image including a file system that includes a camera application; a means for invoking or otherwise initiating the kernel; a means for causing, by the kernel, an initiation of the camera application into the user space, the kernel implementing the kernel space and the user space; a means for obtaining, by the camera application, an image frame from a camera; a means for processing, by the camera application, the image frame to generate a processed image frame; a means for providing, by the camera application, the processed image frame to a frame buffer for presentation of the processed image frame 50A on a display device.

Example 3 is a method that includes, during a boot process of a computing device comprising a processor device and a random access memory (RAM), loading, by a boot loader, a kernel and an initial RAM disk image from a persistent storage device into the RAM, the initial RAM disk image comprising a file system that includes a plurality of services; determining, by the kernel, information that identifies a priority service of the plurality of services; mounting, by the kernel, a RAM disk from the initial RAM disk image as a root file system; and initiating, by the kernel, the priority service from the RAM disk in lieu of any other service of the plurality of services.

Example 4 is the method of example 3 that further includes changing, by the kernel, the root file system from the RAM disk to a file system on a persistent storage device; and, subsequent to initiating the priority service, initiating, from the file system on the persistent storage device, a non-priority service of the plurality of services in the user space.

Example 5 is the method of example 3 that further includes determining, by the boot loader, the priority service; and providing, by the boot loader to the kernel, information that identifies the priority service.

Example 6 is the method of example 5 that further includes storing, by the boot loader in a configuration file, the information that identifies the priority service; and wherein determining, by the kernel, information that identifies the priority service of the plurality of services further includes reading, by the kernel, the configuration file.

Example 7 is the method of example 3 that further includes accessing, by the boot loader or the kernel, real-time sensor data from a sensor; and, based on the real-time sensor data, determining the priority service from the plurality of services.

Example 8 is the method of example 3 that further includes, based on the priority service, accessing, by the kernel, a first boot sequence file of a plurality of different boot sequence files, the first boot sequence file identifying a plurality of services to be initiated by the kernel in a particular order.

Example 9 is the method of example 8, wherein the first boot sequence file identifies that the priority service is to be initiated prior to any other service of the plurality of services.

Example 10 is the method of example 8 that further includes initiating, by the boot loader, the kernel.

Example 11 is the method of example 3 that further includes accessing, by the boot loader or the kernel, real-time sensor data generated by a temperature sensor; determining, based on the real-time sensor data, that a current temperature exceeds a determined threshold; and in response to determining that the current temperature exceeds the determined threshold, determining the priority service to be a service that controls a temperature regulation system.

Example 12 is the method of example 3 that further includes accessing, by the boot loader or the kernel, information that indicates a software update is to be installed; and, in response to accessing the information that indicates the software update is to be installed, determining the priority service to be a service that implements software updates.

Example 13 is a computing device that includes a processor device and a random access memory (RAM), wherein the processor device is to, during a boot process of the computing device, load, by a boot loader, a kernel and an initial RAM disk image from a persistent storage device into the RAM, the initial RAM disk image comprising a file system that includes a plurality of services; determine, by the kernel, information that identifies a priority service of the plurality of services; mount, by the kernel, a RAM disk from the initial RAM disk image as a root file system; and initiate, by the kernel, the priority service from the RAM disk in lieu of any other service of the plurality of services.

Example 14 is the computing device of example 13, wherein the processor device is further to change, by the kernel, the root file system from the RAM disk to a file system on a persistent storage device; and, subsequent to initiating the priority service, initiate, from the file system on the persistent storage device, a non-priority service of the plurality of services in the user space.

Example 15 is the computing device of example 13, wherein the processor device is further to determine, by the boot loader, the priority service; and provide, by the boot loader to the kernel, information that identifies the priority service.

Example 16 is the computing device of example 15, wherein the processor device is further to store, by the boot loader in a configuration file, the information that identifies the priority service; and wherein to determine, by the kernel, the information that identifies the priority service of the plurality of services, the processor device is further to read, by the kernel, the configuration file.

Example 17 is a computing device that includes means for, during a boot process of a computing device comprising a processor device and a random access memory (RAM), loading, by a boot loader, a kernel and an initial RAM disk image from a persistent storage device into the RAM, the initial RAM disk image comprising a file system that includes a plurality of services; means for determining, by the kernel, information that identifies a priority service of the plurality of services; mounting, by the kernel, a RAM disk from the initial RAM disk image as a root file system; and means for initiating, by the kernel, the priority service from the RAM disk in lieu of any other service of the plurality of services.

Example 18 is a computing device that includes a boot loader to, during a boot process of a computing device comprising a processor device and a random access memory (RAM), load a kernel and an initial RAM disk image from a persistent storage device into the RAM, the initial RAM disk image comprising a file system that includes a plurality of services; an information determiner to, by the kernel, determine information that identifies a priority service of the plurality of services; and a RAM disk mounter to, via the kernel, mount a RAM disk from the initial RAM disk image as a root file system; and a priority service initiator to, via the kernel, initiate the priority service from the RAM disk in lieu of any other service of the plurality of services.

Individuals will recognize improvements and modifications to the preferred examples of the disclosure. All such improvements and modifications are considered within the scope of the concepts disclosed herein and the claims that follow.

What is claimed is:

1. A method comprising:
   during a boot process of a computing device comprising a processor device and a random access memory (RAM), loading, by a boot loader, a kernel and an initial RAM disk image from a persistent storage device into the RAM, the initial RAM disk image comprising a first file system that includes a camera application;
   invoking the kernel;
   mounting, by the kernel, a RAM disk from the initial RAM disk image as a root file system;
   causing, by the kernel, an initiation of the camera application into a user space, the kernel implementing a kernel space and the user space;
   obtaining, by the camera application, an image frame from a camera;
   processing, by the camera application, the image frame to generate a processed image frame; and
   providing, by the camera application, the processed image frame to a frame buffer for presentation of the processed image frame on a display device.

2. The method of claim 1 further comprising:
   changing, by the kernel, the root file system from the RAM disk to a second file system on a persistent storage device; and
   subsequent to providing, by the camera application, the image frame to the frame buffer, initiating, by the kernel, a windows compositor application configured to receive image data from a vehicle information application and cause such image data to be presented on the display device.

3. The method of claim 2 further comprising:
   in response to a trigger, sending a signal to the vehicle information application that is different from the camera application to provide information on the display device, wherein the vehicle information application is configured to utilize the windows compositor application to provide the information to the display device.

4. The method of claim 3 wherein the trigger comprises a mode change of a vehicle from a reverse mode to a forward mode.

5. The method of claim 3 further wherein the trigger comprises a receipt of a user input that requests information other than images from the camera be presented on the display device.

6. The method of claim 1 further comprising:
   in response to a trigger, sending, by the kernel to the camera application, an instruction to terminate;
   determining, by the kernel, that the camera application has terminated; and
   in response to determining that the camera application has terminated, unloading the RAM disk from the RAM.

7. The method of claim 1 wherein processing, by the camera application, the image frame further comprises:
   performing a first image altering process on the first image frame to generate a first processed image frame; and
   performing a second image altering process on the first processed image frame to generate a second processed image frame;
   wherein altering the first image frame and altering the first processed image frame are performed without an inter process communication of the image frame between the first image altering process and the second image altering process.

8. The method of claim 1 wherein processing, by the camera application, the image frame further comprises:
   decompressing the image frame; and
   altering a size of the image frame based on a size of the display device;
   wherein the decompressing and the altering are performed without an inter process communication of the image frame between the decompressing and the altering.

9. The method of claim 1 wherein the kernel comprises a Linux kernel.

10. The method of claim 1 wherein the file system of the initial RAM disk image further comprises a camera driver, and further comprising causing, by the kernel, an initiation of the camera driver.

11. The method of claim 1 wherein the file system of the initial RAM disk image further comprises a camera interface, and further comprising causing, by the kernel, an initiation of the camera interface.

12. The method of claim 1 wherein processing the image frame comprises converting pixels of the image frame from a first pixel format to a second pixel format.

13. A system comprising:
    a camera; and a computing device comprising:
  a random access memory (RAM); and
  one or more processor devices to:
    during a boot process of the computing device, load, by a boot loader, a kernel and an initial RAM disk image from a persistent storage device into the RAM, the initial RAM disk image comprising a first file system that includes a camera application;
    invoke the kernel;
    mount, by the kernel, a RAM disk from the initial RAM disk image as a root file system;
    cause, by the kernel, an initiation of the camera application into a user space, the kernel implementing a kernel space and the user space;
    obtain, by the camera application, an image frame from the camera;
    process, by the camera application, the image frame to generate a processed image frame; and
    provide, by the camera application, the processed image frame to a frame buffer for presentation of the processed image frame on a display device.

14. The system of claim 13 wherein the one or more processor devices are further to:
  change, by the kernel, the root file system from the RAM disk to a second file system on a persistent storage device; and
  subsequent to providing, by the camera application, the image frame to the frame buffer, initiate, by the kernel, a windows compositor application configured to receive image data from a vehicle information application and cause such image data to be presented on the display device.

15. The system of claim 14 wherein the one or more processor devices are further to:
  in response to a trigger, send a signal to the vehicle information application that is different from the camera application to provide information on the display device, wherein the vehicle information application is configured to utilize the windows compositor application to provide the information to the display device.

16. The system of claim 13 wherein the one or more processor devices are further to:
  in response to a trigger, send, by the kernel to the camera application, an instruction to terminate;
  determine, by the kernel, that the camera application has terminated; and
  in response to determining that the camera application has terminated, unload the RAM disk from the RAM.

17. The system of claim 13 wherein to process, by the camera application, the image frame, the camera application is further to:
  perform a first image altering process on the first image frame to generate a first processed image frame; and
  perform a second image altering process on the first processed image frame to generate a second processed image frame;
  wherein altering the first image frame and altering the first processed image frame are performed without an inter process communication of the image frame between the first image altering process and the second image altering process.

18. A non-transitory computer-readable storage medium that includes executable instructions to cause a processor device of a computing device to:
  during a boot process of the computing device, load, by a boot loader, a kernel and an initial RAM disk image from a persistent storage device into the RAM, the initial RAM disk image comprising a first file system that includes a camera application;
  invoke the kernel;
  mount, by the kernel, a RAM disk from the initial RAM disk image as a root file system;
  cause, by the kernel, an initiation of the camera application into a user space, the kernel implementing a kernel space and the user space;
  obtain, by the camera application, an image frame from the camera;
  process, by the camera application, the image frame to generate a processed image frame; and
  provide, by the camera application, the processed image frame to a frame buffer for presentation of the processed image frame on a display device.

19. The non-transitory computer-readable storage medium of claim 18 wherein the instructions further cause the processor device to:
  change, by the kernel, the root file system from the RAM disk to a second file system on a persistent storage device; and
  subsequent to providing, by the camera application, the image frame to the frame buffer, initiate, by the kernel, a windows compositor application configured to receive image data from a vehicle information application and cause such image data to be presented on the display device.

20. The non-transitory computer-readable storage medium of claim 19 wherein the instructions further cause the processor device to:
  in response to a trigger, send a signal to the vehicle information application that is different from the camera application to provide information on the display device, wherein the vehicle information application is configured to utilize the windows compositor application to provide the information to the display device.

* * * * *